UNITED STATES PATENT OFFICE.

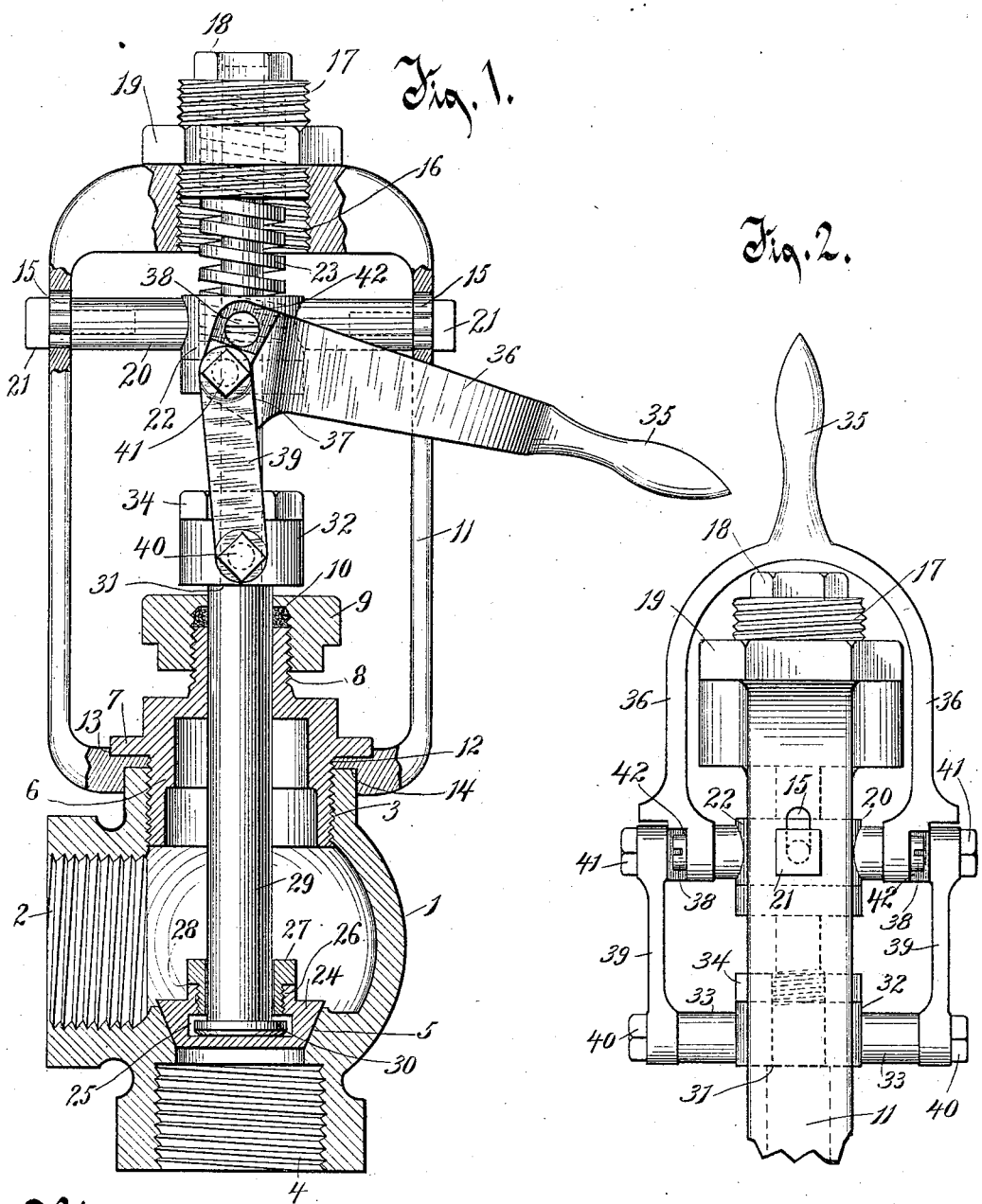

HERBERT I. BOYNTON, OF OSHKOSH, WISCONSIN, ASSIGNOR OF ONE-HALF TO GEORGE M. PAINE, OF SAME PLACE.

COMBINATION WASTE-COCK AND RELIEF-VALVE.

SPECIFICATION forming part of Letters Patent No. 538,317, dated April 30, 1895.

Application filed February 5, 1894. Serial No. 499,228. (No model.)

*To all whom it may concern:*

Be it known that I, HERBERT I. BOYNTON, of Oshkosh, in the county of Winnebago and State of Wisconsin, have invented a new and useful Improvement in a Combination Waste-Cock and Relief-Valve, of which the following is a description, reference being had to the accompanying drawings, which are a part of this specification.

My invention has relation to improvements in combination waste cocks and relief valves.

One of the objects of the device is to provide a quick working waste cock in which, when the valve is seated, it is automatically locked to its seat, except upon the application of force to the operating handle or lever, or when said valve is acted upon by water or excess pressure (if used, for instance, on a steam engine cylinder) with sufficient force to raise it from its seat against the spring pressure.

A further object is the provision of a construction whereby, when the valve is seated, it is held firmly to its seat by spring pressure, the arrangement of the mechanism being such that, when the operating handle or mechanism is in a position to hold the valve away from its seat, the slight normal pressure to which the spring is subjected is not exerted against the valve, but when said handle, or equivalent mechanism, is operated in the proper manner for seating the valve, the spring is compressed to a much greater extent, and said compression is adapted to act against the valve, thereby, while affording means for holding the valve firmly to its seat, yet, at the same time, providing for the unseating of the valve with the slightest amount of power exerted on the handle, by reason of the fact that as said handle is turned in a direction to unseat the valve, compression of the spring against the valve ceases, and the spring is again at only a slight normal pressure unaffecting the valve.

For the accomplishment of the above objects, and others, the invention comprehends the devices and parts as hereinafter described and claimed, or their equivalents.

In the accompanying drawings, Figure 1, is an elevation of the device, certain parts being in section, and other parts broken away, the operating lever or handle being shown in its locked position to hold the valve securely to its seat; and Fig. 2, is an elevation at right angles to Fig. 1, of a fragment of the device, the operating lever or handle being shown as thrown up to a central vertical position.

Like numerals of reference denote like parts in both figures of the drawings.

Referring to the drawings, the numeral 1 indicates a pipe coupling, having an outlet opening 2, an upper opening 3 and an inlet opening 4, the latter provided with a valve seat 5. This particular construction of pipe coupling is unimportant, as many other forms may be substituted therefor which would answer the purpose, of the invention equally well, as, for instance, a form of coupling known as the "globe body."

Secured in the upper threaded opening 3 of the pipe coupling is a connection 6, provided with an annular flange 7, and with an upward-projecting threaded extension 8, on to which screws a nut 9. Between the upper end of the threaded extension and the under side of the recess of the nut, a suitable packing 10 is interposed.

The numeral 11 indicates a rectangular frame, the lower connecting piece thereof being of circular form, and provided with an opening 12, through which the connection 6 passes, the annular flange 7 of said connection resting in a registering recess 13 in the upper side of said lower connecting piece. The under side of the connecting piece is also provided with an annular recess 14, which receives the upper end of the pipe coupling.

The side arms of the rectangular frame 11 are provided, at opposite points, near their upper ends, with elongated slots 15, 15, while the upper connecting piece of said frame is provided with a threaded opening 16, into which screws the tension regulating screw 17, said screw being hollowed out into cup-shaped form, and having its upper end terminating in a hexagonal head 18, for convenience in turning the screw. A jam-nut 19 engages the threads of said screw, above the upper connecting piece of the rectangular frame, and is adapted to be screwed down firmly against said upper connecting piece, in order to hold the screw to adjusted position.

The ends of a cross head 20 work in the elongated slots of the side pieces of the rectangular frame. Preferably, the ends of the cross head are socketed to receive bolts 21, 21. The cross head is provided medially with a cup-shaped or socketed enlargement 22. In the bottom of the socket rests the lower end of a coiled spring 23, said spring extending into the opening 16 of the upper connecting piece of the frame, and entering the socket of the screw 17, the upper end of the spring resting against the top of said socket.

The valve is indicated by the numeral 24. It is provided with an interior recess 25, communicating with a tubular interiorly-threaded neck portion 26, into which screws a centrally apertured cap-piece 27, provided with an annular shoulder 28, which, when the cap is screwed down to place, bears against the upper end of the neck 26.

The valve-rod is indicated by the numeral 29. This rod passes through the central aperture of the cap piece 27, and is provided on its lower end with an annular enlargement 30, which fits freely in the recess 25 thereby forming a loose connection, or a union between the valve rod and valve in the nature of a universal joint, thus always providing for the proper seating of the valve.

The upper portion of the valve rod is less in diameter than the lower portion, whereby a medial shoulder 31 is formed. Upon this shoulder is seated a collar 32, which is provided with laterally-extending arms 33, 33. A jam nut 34 turns, on a threaded portion of the valve rod above the shoulder, against the collar so as to hold said collar to its position upon the shoulder 31.

The lower portion of the valve rod passes freely through the nut 9 and the connection 6, while the upper reduced portion passes through the cup-shaped or socketed enlargement 22 of the cross head 20, and through the tension-regulating screw 17.

The numeral 35 indicates the operating handle or lever, which at its inner end is yoked so as to form the two arms 36, 36. An angular stop 37 projects from each arm near its inner end. Near one corner or angle of the extremity of each arm 36 a screw 38 passes therethrough and enters the enlargement 22 of the cross head, thereby pivoting the handle to said cross head, the pivots being arranged at diametrically opposite points of the medial enlargement.

The numerals 39, 39 indicate links, which at their lower ends are pivotally connected to the extremities of the laterally extending arms 33, 33, by means of pivot pins 40, 40. The upper ends of these links are connected to angles or corners of the extremities of the arms 36, 36 of the handle, by means of pivot pins 41, 41. In order to prevent the upper ends of the links, when actuated, from coming in contact with the pivot screws 38, depressions or recesses 42, 42 are formed in the ends of the arms 36, in which the heads of the screws are countersunk.

By arrangement of the pivotal points 38 and 41 at the end of each arm 36, it will be seen that with the actuation of the handle, practically a crank movement is obtained.

When the operating handle is in the reverse position to that shown in Fig. 1 of the drawings, that is, thrown over to the left, the valve is raised, and the coiled spring is only at a normal compression, which compression, in such case, it will be understood, is not exerted against the valve, the pins 21, 21 of the cross-head being in the lower ends of the slots. The spring is at a normal compression for the reason that in throwing the handle to the left hand position, the valve stem has a free and unobstructed upward movement, and consequently said stem and its valve are raised without any movement being imparted to the cross head.

In order to seat the valve, the handle is turned to the right, which has the effect of forcing down the links 39, 39, which being connected to the arms 33, 33, of course cause the valve-rod to descend, and bring the valve to its seat. In thus turning the operating handle to the right, the moment the valve reaches its seat of course all movement of the valve stem ceases and the cross-head then begins at once to ascend, and compresses the spring to a much greater extent, said compression acting directly against the valve and having practically the effect of lengthening the valve-rod. The ascent of the cross-head continues until the handle reaches a point to bring the pivotal pins 38, 41 and 40 into alignment. In completing the movement of the handle from the position in which the pins are in alignment, the medial pivot pin 41 is forced out of line, thus having the effect of again shortening the valve-rod, and permitting the cross-head to descend a very limited distance, allowing the spring to expand slightly, leaving the pins 21, 21 about one-sixteenth of an inch, from the bottoms of the slots, so as to get the full tension of the spring on the valve, and thus holding the valve firmly to its seat. When the handle is thrown over to the left, and has completed its full swing in that direction, the pivot pin 41 is likewise thrown out of center with the other pivot pins, and consequently the valve is also locked in its open position, but this movement of the handle to the left, as before stated, is effected without any upward movement of the cross head, and consequently there is no compression of the spring against the valve, the spring being only at a slight normal pressure, unaffecting the valve.

It will be noticed that the angular stop 37 contacts with the edge of the link 39 in completing the throw of the handle either to the right or the left. Fig. 1 shows the position of the cross-head after the full travel of the operating handle to the right. It will be noticed that it is somewhat nearer to the upper connecting piece of the rectangular frame than is the case when the operating handle is in the central vertical position, as shown in Fig. 2. The valve in the position shown in Fig. 1 is locked against unseating, unless sufficient pressure is brought to bear upon the valve to overcome the tension of the spring. This occurs when excess pressure of the water through the inlet 4 occurs with sufficient force against the valve to overcome the tension of the spring, in which case the device acts as a relief valve.

It will be observed that the elongations of the slots 15 are prolonged above the greatest distance the ends of the cross-head have to travel therein, when the handle is moved to the right. This prolongation is provided in order to permit of the movement of the cross-head under the excess pressure just referred to, or when the device acts as a relief valve.

The tension of the spring 23 is conveniently regulated by means of the screw 17. By turning this screw down into the threaded opening 16, the tension of the spring is of course increased, while a reverse turn of the screw will decrease the tension of the spring.

In seating or unseating the valve by means of the operating handle or lever, the movement of the coiled spring is such that it insures the valve always finding its seat.

Having thus described my invention, what I claim, and desire to secure by Letters Patent, is—

1. In a relief valve and waste cock, the combination, of a casing provided with a valve-seat, a movable part, a spring acting thereon, a valve, and an operating lever connected to the movable part and also having a connection with the valve, the two connections, when the throw of the lever is completed in either direction, being eccentric with relation to each other, whereby the valve is locked when either seated or unseated, the lever, when actuated in a direction to unseat the valve, adapted to raise said valve from its seat without operatively affecting the movable part, and consequently without compressing the spring beyond its normal compression, and when actuated in the opposite direction adapted to force said valve toward its seat without operatively affecting the movable part, the continued throw of the lever after the valve is seated adapted to actuate the movable part to compress the spring beyond its normal compression, whereby the valve is held firmly to its seat, substantially as set forth.

2. The combination, of a casing provided with a valve opening, a frame a cross-head mounted in the frame, and having a limited play therein, a valve and valve rod, an operating handle, a link pivotally connected at one end to the valve rod, and having its opposite end pivotally connected to the operating handle, and a spring adapted, when the lever is in position to unseat the valve, to be under a slight normal pressure from the cross-head, said pressure unaffecting the valve, and when the lever is manipulated to seat the valve, said spring adapted to be compressed against the cross-head to a greater extent than its normal compression, said increased pressure or compression being exerted through the cross-head against the valve, substantially as set forth.

3. The combination, of a casing provided with a valve opening, a frame, a cross-head mounted in the frame and having a limited play therein, a valve and valve stem, the latter provided with laterally-projecting arms, an operating handle having its inner end yoked to form two arms, the ends of said arms pivoted at opposite points to the enlargement of the cross-head, links pivotally connected at their ends to the laterally-projecting arms of the valve stem, and having their opposite ends pivotally connected to the pivoted ends of the arms of the handle, and a spring adapted, when the lever is in position to unseat the valve, to be under a slight normal pressure from the cross-head, said pressure unaffecting the valve, and when the lever is manipulated to seat the valve said spring adapted to be compressed against the cross-head to a greater extent than its normal compression, said increased pressure or compression being exerted, through the cross-head, against the valve, substantially as set forth.

4. The combination, of a casing provided with a valve opening, a frame having its upper connecting piece provided with a threaded opening, a cross-head mounted in the frame and having a limited play therein, said cross-head provided with a medial socketed enlargement, a compression spring seated in the socket of the enlargement, and extending into the opening of the upper connecting piece of the frame, an inverted cup-shaped screw turning in said opening of the connecting piece, and acting against the spring, a valve and valve-rod, the latter provided with laterally-projecting arms, an operating handle having its inner end yoked to form two arms, the ends of said arms being pivoted to the medial enlargement of the cross-head, and links pivotally connected at their ends to the laterally-projecting arms of the valve-rod, and having their opposite ends pivotally connected to the pivoted ends of the arms of the handle, substantially as set forth.

5. The combination, of a casing provided with a valve opening, a frame, a cross-head mounted in the frame, and having a limited play therein, a compression spring between the cross-head and the frame, and adapted to be compressed by said screw, a valve and valve-rod, the latter provided medially with laterally-projecting arms, and having its upper portion passing freely through the socketed enlargement of the cross-head and through the inverted cup-shaped screw, an operating handle having its inner end yoked to form two arms, the ends of said arms pivoted to the medial enlargement of the cross-head, and links pivotally connected at their ends to the laterally-projecting arms of the valve-rod, and having their opposite ends pivotally connected to the pivoted ends of the arms of the handle, substantially as set forth.

6. The combination, of a frame having a screw-threaded aperture therein, an inverted cup-shaped screw turning in said aperture, a cross-head having a limited movement in the frame, a compression spring bearing against the cross-head, and having its end extending into the inverted cup-shaped screw, a valve and valve stem, means for actuating the valve stem, whereby, when actuated in one direction to unseat the valve, the spring is only under a slight normal pressure from the cross-head, said normal pressure unaffecting the valve, and, when actuated in the other direction to unseat the valve, said spring is compressed against the cross-head to a greater extent than its normal compression, said increased pressure or compression being exerted, through the cross-head, against the valve, substantially as set forth.

In testimony whereof I affix my signature in presence of two witnesses.

HERBERT I. BOYNTON.

Witnesses:
GEO. C. RAMSEY,
CHAS. NEVITT.